United States Patent [19]

Reed et al.

[11] 4,035,171
[45] July 12, 1977

[54] GAS LIQUID SEPARATOR FOR FLARE SYSTEMS

[75] Inventors: Robert D. Reed; Robert E. Schwartz, both of Tulsa, Okla.

[73] Assignee: John Zink Company, Tulsa, Okla.

[21] Appl. No.: 680,094

[22] Filed: Apr. 26, 1976

[51] Int. Cl.² .................................... B01D 50/00
[52] U.S. Cl. ............................... 55/319; 55/186; 55/204; 55/426; 55/444
[58] Field of Search ............ 55/184, 186, 204, 315, 55/319, 320, 337, 426, 444, 459 R, 459 A, 459 B, 459 C, 459 D, DIG. 22, 394, 318, 325

[56] References Cited

U.S. PATENT DOCUMENTS

| | | | |
|---|---|---|---|
| 722,272 | 3/1903 | Baker | 55/444 |
| 1,044,208 | 11/1912 | Luhn | 55/444 |
| 1,351,433 | 8/1920 | Nelis | 55/444 |
| 2,489,903 | 11/1949 | Kraft et al. | 55/426 |
| 2,586,221 | 2/1959 | Glasgow | 55/186 |
| 2,782,772 | 2/1959 | Blaser | 55/459 R |
| 2,868,315 | 1/1959 | Chaple et al. | 55/186 |
| 2,887,174 | 5/1959 | Ray | 55/186 |

*Primary Examiner*—Bernard Nozick
*Assistant Examiner*—David L. Lacey
*Attorney, Agent, or Firm*—Head, Johnson & Chafin

[57] ABSTRACT

A gas-liquid separator for use in flare systems comprising a vessel which incorporates four stages of gas-liquid separation. The first stage employs centrifugal (tangential) separation means by injecting the incoming mixture of liquid and gas tangential to the internal cylindrical surface of the vessel. A second stage is provided by immediately following baffling. A third stage of separation involves the drop out of liquid droplets by reduction of flow velocity due to the large cross-sectional diameter of the vessel. A fourth stage of separation involves passing the gas through a demister which involves design of a special shape of contact members which insure contact of the demister elements by the flowing gas, to further reduce the liquid content.

4 Claims, 8 Drawing Figures

GAS LIQUID SEPARATOR FOR FLARE SYSTEMS

BACKGROUND OF THE INVENTION

This invention lies in the field of gas-liquid separation.

More particularly, this invention lies in the field of gas-liquid separation of fluids, which are emergency relieved products, which are passed to a flare for complete smokeless combustion before release to the atmosphere.

Flares for emergency relieved products are designed for and operate properly only when the products flared are in gaseous phase. Since, from the point of relief, the products may be partially in liquid phase, and thus unsuited for discharge from the flare, it is necessary for the relieved products to pass through gas-liquid separation before reaching the flare, for discharge of gaseous phase products for flare burning within the atmosphere.

Typically, and for gas-liquid separation, flare systems include a "knock-out pot" which is simply a vessel of considerably larger cross-sectional area than that of the line or conduit to the flare, through which the fluid is being passed. Such a knock-out pot is generally, in length, some 5 to 20 times the diameter of the conduit. While these knock-out pots remove a large portion of the liquid because of the decreased flow velocity and permit the continued passage of the gases to the flare, they do not remove all of the potentially recoverable liquid, dependent, of course, on the distribution of drop sizes.

This is because some of the liquid carried by the gas stream is in the form of droplets of 0.015 inch diameter and greater.

In the knock-out drum, the gas velocity is as low as 9 fps, which is the average knock-out drum gas movement velocity. At this velocity, the gas will carry the 0.015 inch diameter droplets right on through the knock-out drum to the flare. Drops of this size carried with the gas result in a significant loss of product liquid. Also, they provide a problem in burning the mixture with complete smoke suppression, as is required in flares. The liquid is in most cases valuable hydrocarbons, and their loss is an unwarranted energy loss.

In the prior art, it has been common to use the knock-out pot as a means of separating large liquid droplets with partial removal of the liquid by this means.

In the prior art, it has also been common to use centrifugal separation to remove a large part of the larger drops entrained in a gas flow.

It has also been common in the prior art to use demisters. In such devices, the flow of fluid causes the liquid droplets to impinge on the surface of the elements of the demister and to attach themselves to the surface and to flow down by gravity to be collected at the bottom of the vessel.

It is, therefore, a primary object of this invention to provide in one simple mechanical system, four stages of separation which involve the principles of centrifugal separation, baffle diversion separation, low transit velocity separation, and demister separation, with novel combination of the four methods, and an improved construction of the demister separation elements.

SUMMARY OF THE INVENTION

These and other objects are realized, and the limitations of the prior art are overcome in this invention by utilization of a large cylindrical vessel, the cross-sectional area of which is many times the cross-sectional area of the conduit which transmits the fluid to be burned from the point of relief to the flare. The vessel is supported with its axis horizontal, and liquid may be collected in the bottom of the vessel and drained for recovery by means of a pipe and stored as a liquid.

The fluid enters the vessel through an inlet pipe which is tangential to the inner surface at the top of the vessel near a first end. The fluid inflow of gas and entrained liquid droplets follows the curvature of the inner surface, with the liquid larger droplets, because of their greater mass and inertia, being forced into wetting contact with the wall. As the mixutre flows along the inner surface and downwardly, the liquid follows close to the surface, and the gas farther from the surface. A horizontal plate baffle is supported inside of and near the bottom of the vessel, with its trailing edge in contact with the wall of the vessel. The leading edge is separated slightly from the wall and faces the oncoming fluid. The liquid passes under the separating baffle plate and is trapped under the baffle plate, from which it can be drained. The gas flow because of its low inertia is diverted over the top of the separator baffle plate, and then continues in a helical flow, horizontally, with greatly reduced velocity, causing further separation of liquid droplets.

There is a transverse wall near the second end of the vessel which supports a demister, which comprises a large plurality of vertical elements through which the gas must flow in order to reach the outlet of the vessel. The path that the gas flows is a tortuous curving path, such that any liquid droplets carried by the gas must impinge on the surface of the demister elements to which they attach themselves and wet the surface, to flow downwardly, and be collected in the bottom of the vessel.

After passing through the demister, the separated gas then passses through an outlet pipe in the top of the vessel at the second end and through a conduit means to the flare.

The demister is formed within a frame and includes a plurality of rows of vertical elements, each of which has a cross-section in the form of a letter M, with short outer legs. On successive rows, the outer legs of the elements of one row overlap spatially the outer legs of those on the adjacent row, so that there is no straight through passage of gas. Consequently, because of the inertia of the liquid, it is forced to contact and to wet the surface of one or another of the elements for liquid droplet removal as the gas passes through the demister. The collected liquid then moves downward by gravity for collection inside the vessel.

BRIEF DESCRIPTION OF THE DRAWINGS

These and other objects and advantages of this invention and a better understanding of the principles and details of the invention will be evident from the following description taken in conjunction with the appended drawings in which.

DESCRIPTION OF THE PREFERRED EMBODIMENT

Figure 1:
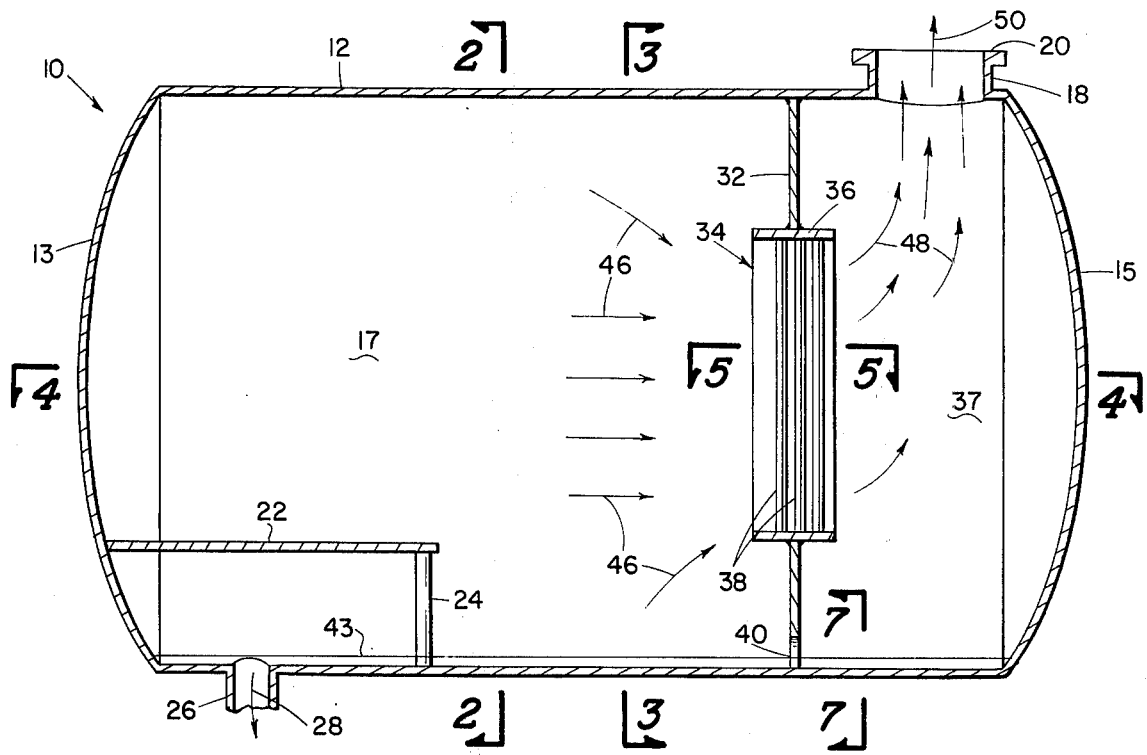
FIG. 1 represents in vertical cross-section one embodiment of this invention.

Referring now to the drawings, and particularly to FIGS. 1, 2, 3 and 4, there is shown in FIG. 1 a vertical cross-section of one embodiment of this invention.

The vessel indicated generally by the numeral 10 comprises a horizontal cylindrical shell wall 12, having a first end wall closure 13 and a second end wall closure 15, an inlet pipe 14 of cross-sectional area which is a smaller than the cross-sectional area of the vessel 10 is attached near the first end 13 and is positioned at the top of the vessel tangential to the circular wall 12.

Figure 4:
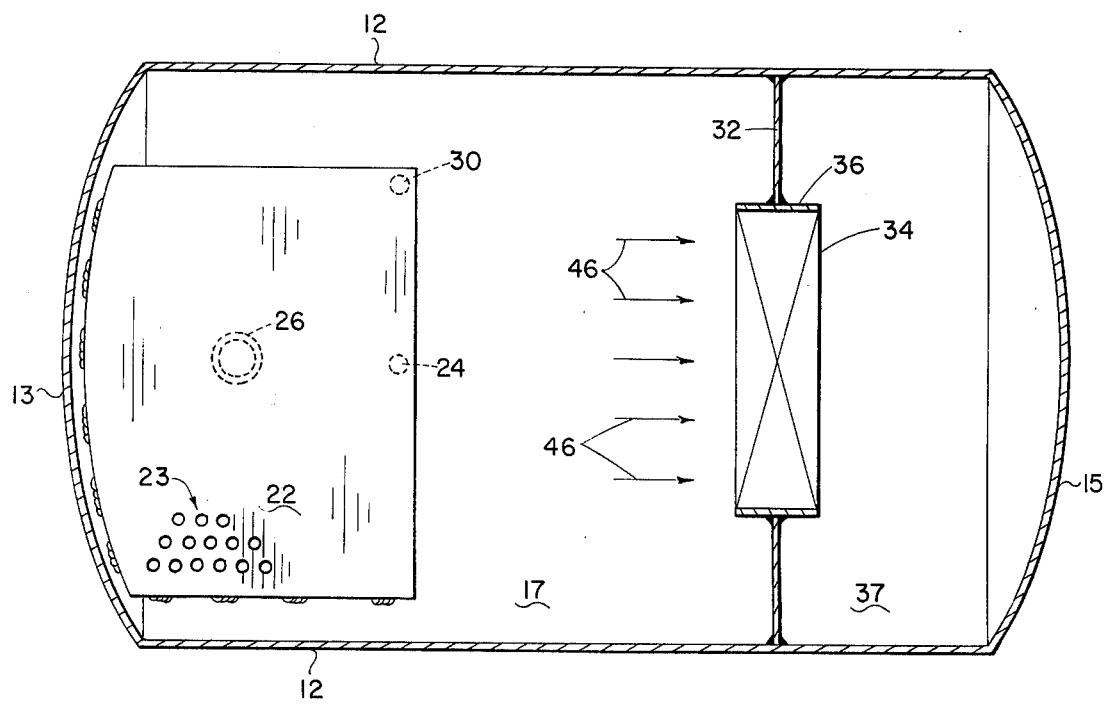
FIG. 4 illustrates a horizontal cross-section taken across the plane 4—4 if FIG. 1.

There is a diversion or separator plate baffle means 22 supported in the lower portion of the vessel at the first end 13. As shown in FIG. 4, this is welded at a first edge to the end wall 13 of said vessel and also at a second edge to the cylindrical shell wall 12 of said vessel, so as to seal against fluid flow along these two contact edges. The separator plate 22 is further supported by means of legs 24 and 30, for example with its third edge separated from the cylindrical wall 12. The plate 22 can be a solid plate or may be perforated (23) so as to release any gas trapped under the plate.

Figure 2:
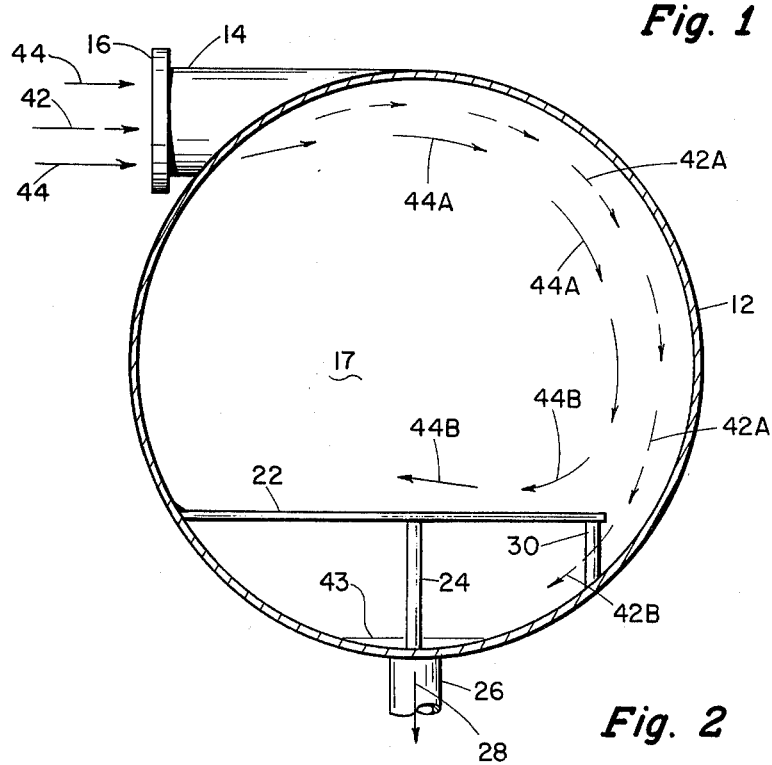
FIG. 2 represents a cross-section illustrating the centrifugal separation of the liquid and gas taken across the plane 2—2 of FIG. 1.
Figure 3:
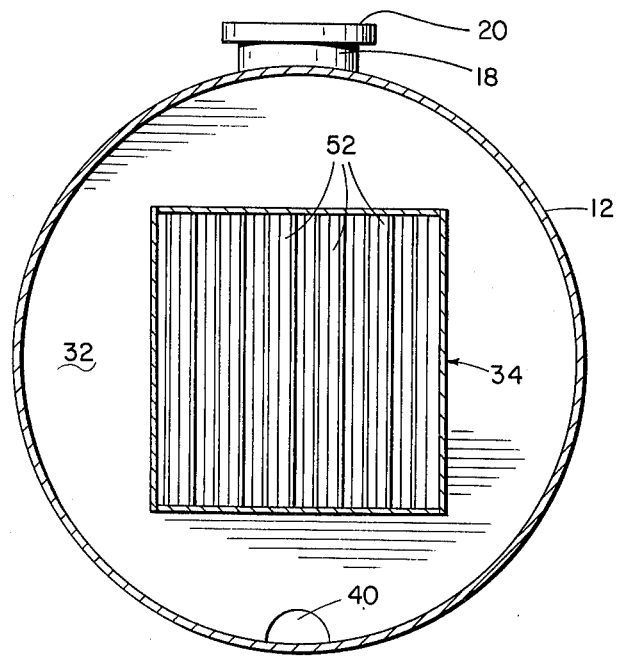
FIG. 3 illustrates a view of the demister in a transverse wall taken across the plane 3—3 of FIG. 1.

As illustrated in FIG. 2, the inlet pipe 14 is joined to a conduit (not shown) by means of flange 16. The incoming fluid is a mixture of liquid shown by dashed arrow 42 and gas, shown by solid arrows 44. They enter the vessel in a horizontal flow and contact the wall 12, following the inner contour of the wall, as they flow downwardly in accordance with arrows 42A and 44A. The liquid droplets 42A have greater inertia than the gas and consequently flow in contact with the inner surface, following the arrows to the point 42B where they flow under said third edge and become trapped under the separator plate 22, and collect as a pool 43 and drain into the pipe 26, in accordance with arrow 28.

The gas flows in accordance with arrows 44A around the inner surface of the vessel but is diverted over the plate 22 in the form of arrows 44B. It flows in a helical manner along the length of the vessel and converges to a more or less horizontal flow 46 as it approaches the wall 32, which separates the vessel into two portions, 17 and 37. The second portion 37 at the end 15 is of much smaller volume than the principle space 17.

The separator wall 32 has a demister 34 positioned axially in the wall, which comprises a plurality of vertical elements 52, which will be further described in connection with FIGS. 5 and 6. The flow of gas 46 still contains smaller droplets than are knocked out by the centrifugal separation near the first end 13, and by the low velocity of flow in the central portion of the vessel. As the gas flows between and around the vertical elements of the demister, since there is no straight through flow possible whatever, droplets are carried by the gas must contact the surface of the demister elements, where they attach themselves to the surface, and are thus separated from the gas. The outflow from the demister is in accordance with arrows 48 and 50, through the outlet pipe 18 and to a conduit (not shown) leading to a flare, which is attached to the flange 20.

Figure 7:
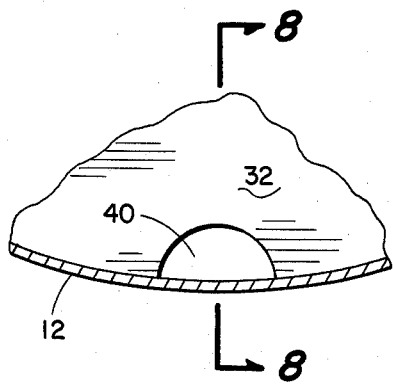
FIGS. 7 and 8 illustrate views of the transverse wall across the vessel, illustrating an opening for the passage of liquid droplets to the outlet pipe.
Figure 8:
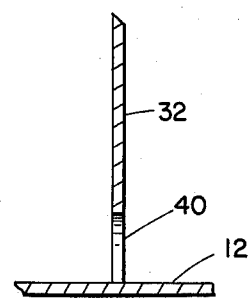

There is an opening 40 in the wall 32, at the contact with the bottom of the circumferential wall 12 of the vessel, as illustrated in FIGS. 7 and 8 for drainage of liquid from volumes 37 and 17. FIG. 7 is taken as a cross-sectional view across the plane 7—7 of FIG. 1, and FIG. 8 is taken across the plane 8—8 of FIG. 7.

Figure 5:
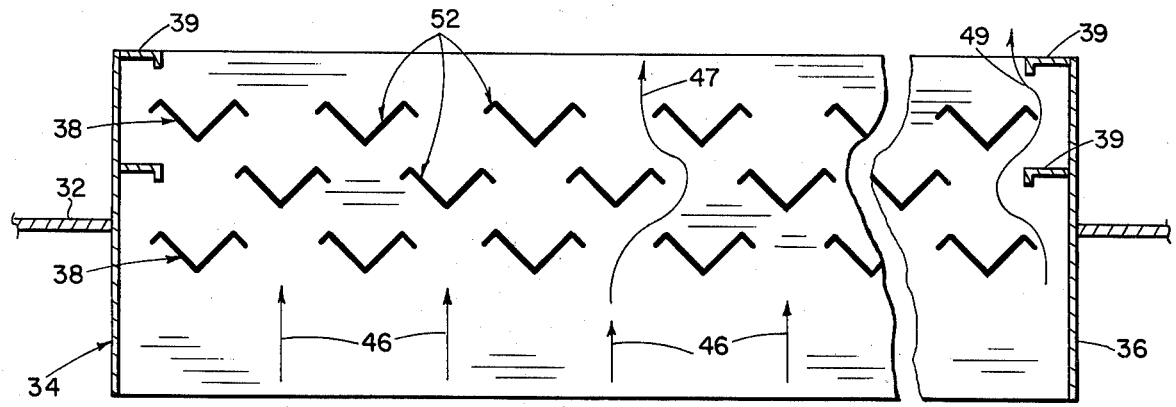
FIG. 5 represents a horizontal cross-section through the demister in plane 5—5 of FIG. 1.
Figure 6:
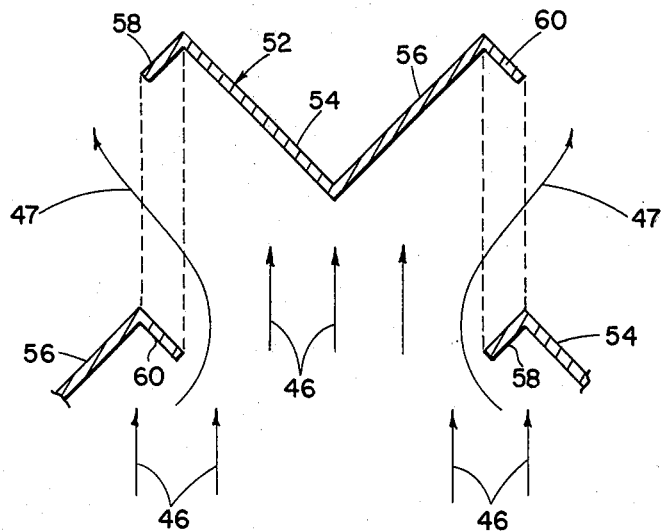
FIG. 6 illustrates in larger detail the construction of the demister of FIG. 5.

Referring now to FIGS. 5 and 6, there is shown in horizontal cross-section a view of the demister, which is inserted into the transverse wall 32 in the vessel 10. There is a rectangular frame 36 which forms the outer support for a plurality of vertical demister elements 52, which are positioned in a plurality of rows 38 separated longitudinally from each other. Each of the elements 52 are of the shape shown in cross-section in FIG. 6. This is in the form of a letter M comprising a central V portion with two legs 54 and 56, with two shorter outer legs 58 and 60, each of the legs being at a 90° angle with the adjacent legs. Each of the elements 52 of cross-sectional shape, as in FIG. 6, is supported in a vertical position and attached to upper and lower portions of the frame 36. In adjacent rows, the elements 52 are overlapped such that the leg 60 of one element in one row is opposite the leg 58 of an element in the adjacent row. Consequently, as in FIG. 6, as the gas flows in accordance with arrows 46, there is no way that the gas can pass through the demister in a straight through opening, and the gas must flow in a curved path 47. If there are any drops of sufficient size, such that their inertia will not permit them to take the curved path 47, they will impinge on the surface of the elements 52 and will be collected thereby and drained out of the pipe 26.

At the vertical sides of the frame 36 there are vertical portions 39 which are provided to shield the outer edges of the elements close to the wall to prevent a straight through flow and to force a curved flow 49. In the interior portion of the demister, the flow is in accordance with arrows 47; and correspondingly, near the side walls, the flow is in accordance with the arrow 49.

The fluid entering the vessel as shown by arrows 42 and 44 is travelling at significant velocity, generally in the range of 200 fps or more. The gas stream carries liquid droplets, because a portion of the gases of the stream will cool to the dew point prior to reaching the separator. In other cases, liquid droplets will come directly from the point of relief to the flare system in an atomized state. Liquid particles present as a result of cooling between the point of relief and arrival at the separator and before coalescence to larger droplets are typically in the range of size 0.015 inch in diameter. Correspondingly, atomized liquid droplets are in the range of diameter from 0.00939 inch up to 0.032 inch typically.

In any case of droplet size, where the entering stream of liquid laden gases enters the knock-out vessel at significant velocity, the droplets have much greater intertia than that of an equal volume of gases and are driven into the circular walls of the vessel to accumulate as a significant volume of liquid 43 in the bottom of the vessel. The liquid being subjected to the force of entering gas moves substantially as shown by the arrows 42, 42A and 42B.

As the gas and liquid move into the vicinity of the baffle plate 22, the gas is diverted horizontally 44B, but the liquid proceeds as per the liquid arrow 42B into the "stilling" area beneath the baffle, from which it proceeds to the liquid drain 26. The baffle plate 22 may be either a solid or perforated plate so that any gas flowing under the leading edge of the plate will pass upwardly through the perforations, leaving the liquid trapped underneath.

Through the central portion of the vessel, the gas flow is typically at about 9 fps, which will carry with it liquid droplets as large as 0.015 inch diameter. Thus, further gas-liquid separation is desired. The preferred separation is accomplished by the multiple impact demister 34, with the demister elements 52 to remove liquid particles which are larger than 0.00039 inch. Further removal of liquid from the gas stream past the demister is not economically feasible.

What has been described is a gas-liquid separator which comprises four stages of separation, each of which has been used in the industry separately, but are, in this invention, combined in one operating device which provides efficient separation because of the physical relationship of the parts, and because of the particular design of the demister assembly.

While the invention has been described with a certain degree of particularity, it is manifest that many changes may be made in the details of construction and arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed is:

1. A gas-liquid separator system providing four stages of separation, comprising;
   a. a horizontal circular cylindrical walled vessel with an inlet pipe contiguous to a first end, an outlet pipe contiguous to a second end, the inlet pipe attached tangential to the wall of the vessel at the top of the vessel;
   whereby the incoming gas and liquid will flow along the inner wall of the vessel toward the bottom;
   b. horizontal separator plate baffle means attached on a first edge to the wall at said first end, and on a second edge to the cylindrical wall of said vessel, and having a third edge which is separated from the cylindrical wall;
   whereby the liquid and liquid droplets flowing downwardly close to the inner wall will flow under the separator plate and be trapped, while the gas will flow over the plate and in a helical manner along the vessel;
   c. drain means for trapped liquid in the bottom of said vessel;
   d. demister means supported in a transverse wall near the second end of said vessel, said transverse wall extending across substantially the full cross section of said vessel, said demister means comprising;
      1. frame means;
      2. a plurality of vertical contact elements spaced apart in a plurality of separate rows attached to said frame means;
      3. each contact element constructed of sheet material with its cross-section in the form of an M, with short outer legs;
      4. said contact elements spaced apart in successive rows in staggered formation so that the outer legs in one row overlap the outer legs in adjacent rows;
   whereby there is no straight through opening, and droplets of liquid carried by the gas must contact the vertical elements.

2. The gas-liquid separator as in claim 1 in which the cross-sectional area of said vessel is greater than the cross-sectional area of said inlet pipe.

3. The gas-liquid separator as in claim 1 in which said separator plate baffle is a solid plate.

4. The gas-liquid separator as in claim 1 in which said separator plate baffle is perforated.

* * * * *